No. 782,702. PATENTED FEB. 14, 1905.
E. SCHERER.
HOG SCALDING TROUGH.
APPLICATION FILED OCT. 6, 1904.
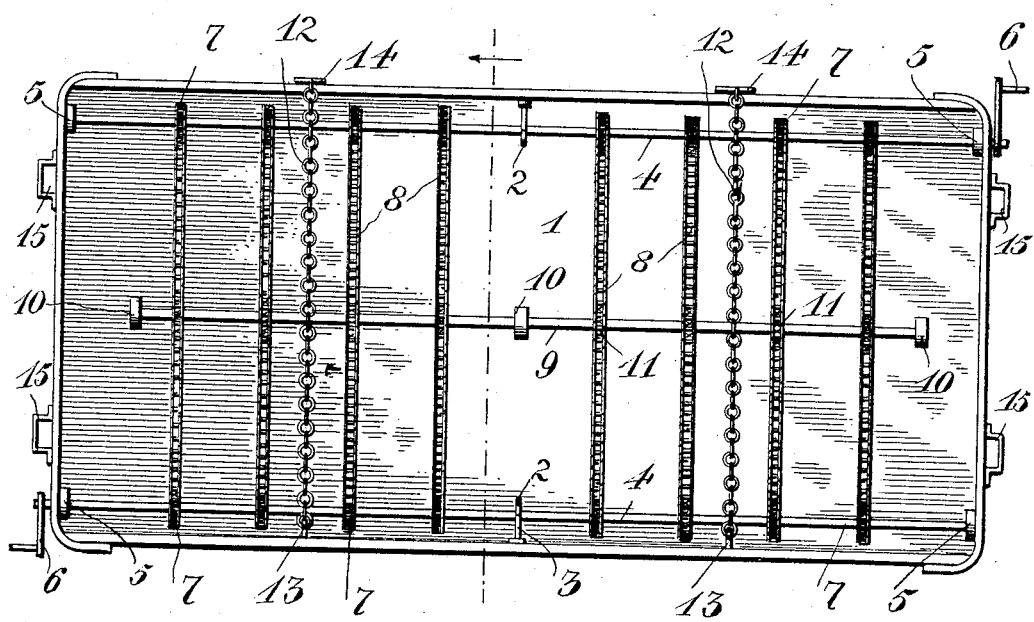
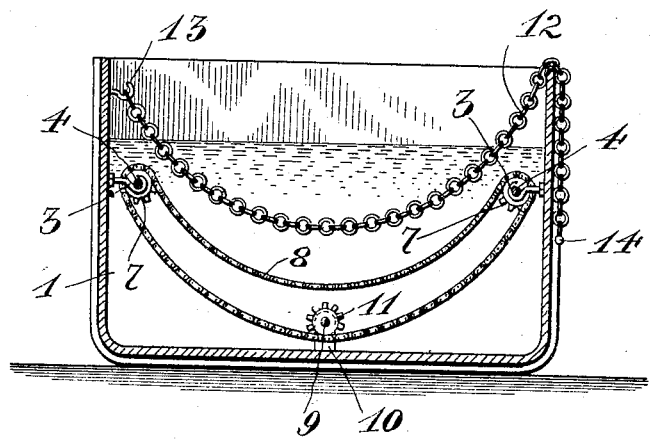
Witnesses
Inventor
Emil Scherer
by H. B. Wilson
Attorney No. 782,702. Patented February 14, 1905.

UNITED STATES PATENT OFFICE.

EMIL SCHERER, OF ATCHISON, KANSAS.

HOG-SCALDING TROUGH.

SPECIFICATION forming part of Letters Patent No. 782,702, dated February 14, 1905.

Application filed October 6, 1904. Serial No. 227,454.

*To all whom it may concern:*

Be it known that I, EMIL SCHERER, a citizen of the United States, residing at Atchison, in the county of Atchison and State of Kansas, have invented certain new and useful Improvements in Hog-Scalding Troughs; and I do declare the following to be a full, clear, and exact description of the invention, such as will enable others skilled in the art to which it appertains to make and use the same.

My invention is an improved hog-scalding trough; and it consists in the construction, combination, and arrangement of devices hereinafter described and claimed.

The object of my invention is to provide an improved hog-scalding trough having means whereby the carcass may be readily turned in the scalding-water in the trough and whereby the carcass may be lowered into and raised from the trough.

In the accompanying drawings, Figure 1 is a top plan view of a hog-scalding trough embodying my improvements, and Fig. 2 is a transverse sectional view of the same.

The trough 1 may be of any suitable size and shape and may be made of any suitable material. In its sides it is provided with bearings 2, here shown as hook-bolts 3. A pair of longitudinally-disposed shafts 4 are journaled in the said bearings and are also journaled in bearings 5 at the ends of the trough, and each of said shafts is provided at one end with a crank 6, whereby it may be revolved. On the said shafts are sprocket-wheels 7, which are disposed opposite one another. Transversely-disposed endless sprocket-chains 8, which are arranged in the trough, connect the sprocket-wheels 7 of the respective shafts and are of such length as to hang loosely in the trough. A shaft 9, which is disposed longitudinally of the trough, is journaled in bearings 10, which are secured on the bottom of the trough, and the said shaft is provided with sprocket-wheels 11, the lower sides of which are engaged by the lower leads of the chains 8.

The trough is filled to the required extent with hot water, and the carcass when placed in the trough bears on the chains 8. By rotating the shafts 4 by means of their cranks the chains 8 will be caused to move in one direction or the other, according to the direction in which the said shafts are rotated, and to roll or turn the carcass in the trough, thereby exposing every portion of the carcass to the action of the hot water. Furthermore, the chains by reason of the friction they create serve to remove the hair from the carcass to a considerable extent.

To enable the carcass to be readily lowered into and removed from the trough, I provide a pair of lowering-chains 12, which are secured to one side of the trough, as at 13, and are of sufficient length to extend entirely across the trough and are provided at their free ends with handles or handholds 14. At the ends of the trough are handles 15 to facilitate the lifting of the trough and to enable it to be readily removed from one place to another.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A hog-scalding trough having bearing-hooks in opposite sides, shafts journaled in said bearing-hooks, provided with cranks whereby they may be rotated, and being further provided with sprocket-wheels, endless chains disposed transversely in the trough and engaging the sprocket-wheels of the respective shafts, and a shaft in the bottom of the trough having suitable bearings and provided with direction-wheels, the lower sides of the latter being engaged by the lower leads of the said chains, substantially as described.

In testimony whereof I have hereunto set my hand in presence of two subscribing witnesses.

EMIL SCHERER.

Witnesses:
  H. H. NEWCOMB,
  CHAS. J. CONLON.